Patented Apr. 7, 1925.

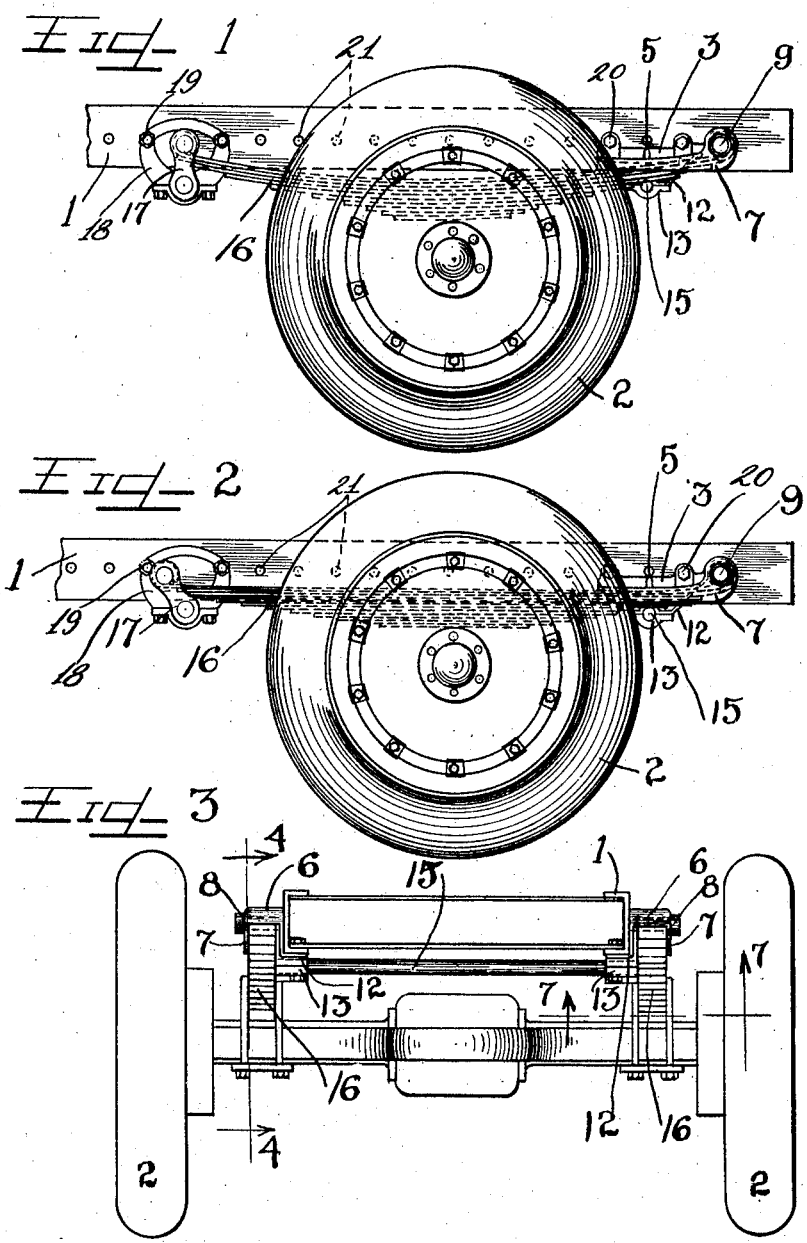

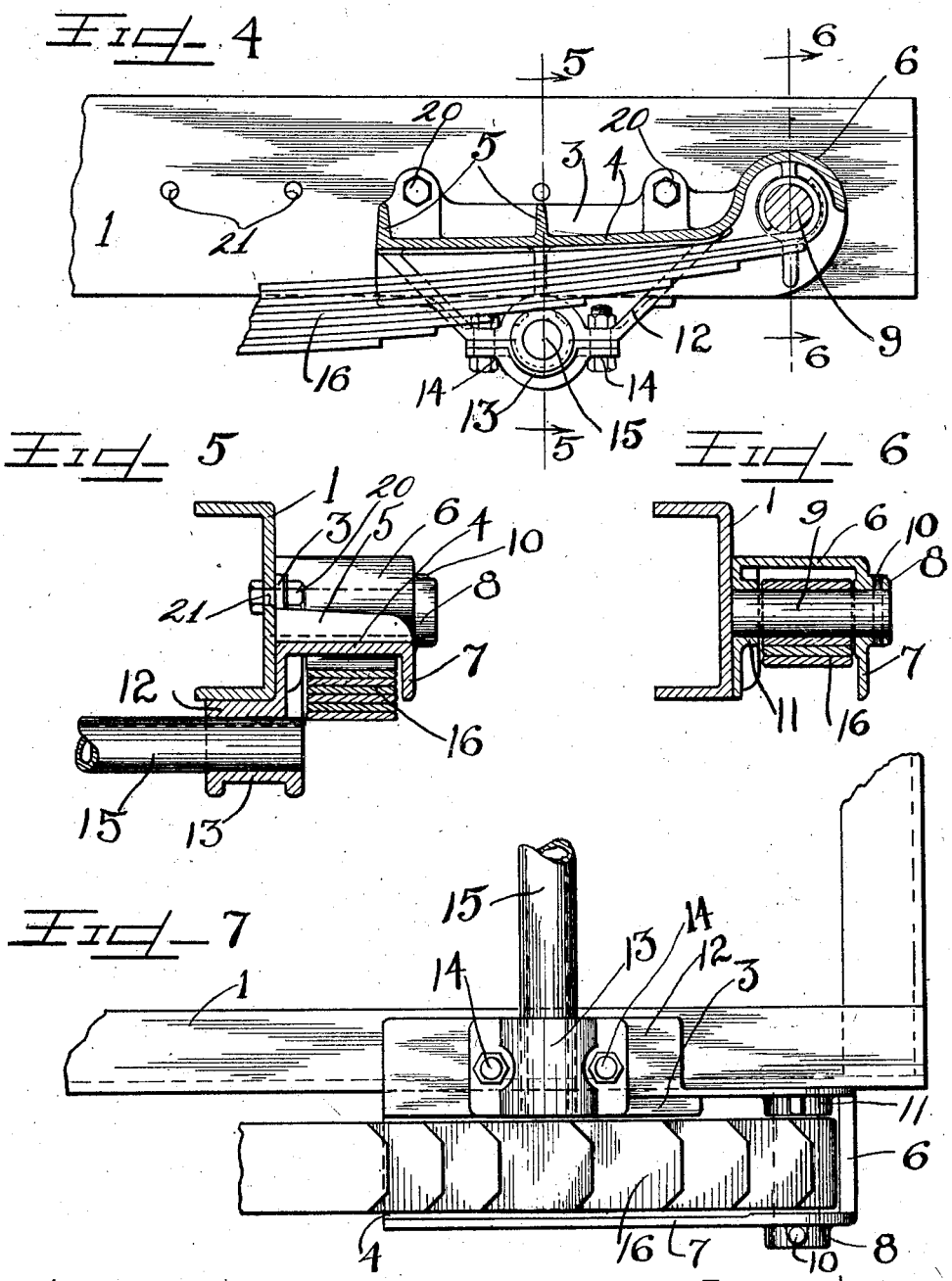

1,532,124

UNITED STATES PATENT OFFICE.

ALBERT EUGENE COOK, OF EVANSTON, AND THOMAS VAN TUYL, OF KANKAKEE, ILLINOIS; SAID VAN TUYL ASSIGNOR TO SAID COOK.

COMPENSATING LOAD-CARRYING DEVICE.

Application filed November 15, 1922. Serial No. 601,048.

*To all whom it may concern:*

Be it known that we, ALBERT EUGENE COOK and THOMAS VAN TUYL, citizens of the United States, and residents of the city of Evanston, in the county of Cook and State of Illinois, and the city of Kankakee, in the county of Kankakee and State of Illinois, respectively, have invented certain new and useful Improvements in a Compensating Load-Carrying Devices; and we do hereby declare that the following is a full, clear, and exact description of the same, reference being had to the accompanying drawings, and to the numerals of reference marked thereon, which form a part of this specification.

This invention relates to an improved type of a load-carrying compensating device for use on motor trucks and the like, whereby the flexible rear portions of rear truck springs are adapted, when under heavy strain, to flatten out against complementary curved plates forming parts of spring housings which are mounted on the frame sills to afford a means whereby the springs may adjust themselves to the imposed loads.

It is an object of this invention to provide an automatic load compensating device for motor trucks and the like.

It is also an object of this invention to provide housings on the frame of a motor truck, said housings having plates positioned to permit the rear truck springs to coact therewith to compensate for heavy loads.

It is furthermore an object of the invention to provide a motor truck with rear springs having shackles at their forward ends supported on removable castings, while the rear ends are anchored within housing removably secured to the truck frame to cause pulling of a load instead of pushing it.

It is an important object of the invention to provide a truck load compensating device wherein the flexible rear portions of springs are mounted to coact with stop members on the truck frame to cause a reduction in the rebound action with load increases by reducing the effective length of the springs.

Other and further important objects of this invention will be apparent from the disclosures in the specification and the drawings.

The invention (in a preferred form) is illustrated on the drawings and hereinafter more fully described.

On the drawings: Figure 1 is a side elevation of the rear portion of a truck chassis equipped with a compensating load-carrying device embodying the principles of this invention.

Figure 2 is a similar view showing the position of parts when under a heavy load.

Figure 3 is a rear view of the truck chassis.

Figure 4 is an enlarged fragmentary sectional view taken on the line 4—4 of Figure 3.

Figure 5 is a detail section taken on line 5—5 of Figure 4.

Figure 6 is a detail section taken on the line 6—6 of Figure 4.

Figure 7 is an enlarged bottom plan view taken on the line 7—7 of Figure 3.

As shown on the drawings: The reference numeral 1 indicates a motor truck chassis frame, the rear end of which is supported by rear wheels 2. Each chassis sill is provided with a longitudinal row of openings or apertures 21 spaced predetermined distances apart. Rigidly secured by bolts 20 to the outer side of each frame sill is a casting or housing 3 having an outwardly projecting flange or plate 4 reinforced by the webs 5. The plate 4 is formed with the rear end curved upwardly and then downwardly to form a box or hood 6. Integrally formed on the outer edge of the housing plate 4 and the hood 6 thereof is a downwardly directed flange or apron 7. Integrally formed in the flange 7 is a bearing 8 for receiving one end of a transverse stud 9. The stud 9 is provided with a diametric passage for receiving a retaining pin 10. A bearing 11 is also provided within the hood 6 to receive the inner end of the stud 9.

Integrally formed on the bottom of the housing 3 and below the plate 4 is an upper bearing section or support 12 which projects inwardly beneath the chassis frame sill as shown in Figure 5. A lower bearing section 13 is secured to the upper bearing section 12 by bolts 14. Projecting into the bearing 12—13 is one end of a transverse shaft 15, which forms a brace for the housings 3.

Engaged on the stud 9 within the hood 6 between the bearings 8 and 11 is the rear end of a leaf spring 16, the forward end of which is supported by a shackle 17 pivotally connected at one end to a casting or bracket plate 18 having spaced openings therein to permit the same to be removably bolted to the chassis sill by bolts 19.

It will be noted that the front ends of the rear springs 16 are connected to the shackles 17, while the rear ends of said springs are anchored to the studs 9 thereby causing the load carried by a truck to be pulled instead of being pushed. The rear ends of the springs 16 are constructed to be more flexible than the forward ends, thereby permitting the rear ends of said springs under load stresses to bear against and conform to the shape of the curved stop plates 4 which extend forwardly and downwardly from the studs 9. The springs 16 are thus adapted to automatically adjust themselves to subjected load stresses. Under a heavy load, the springs will move from the position illustrated in Figure 1 into the stressed position of Figure 2 with the rear flexible ends of said springs pressing against the curved plates 4, thereby reducing the length of the active portions of the springs which are consequently stiffened to compensate for the increased load. When the springs flatten out the rear ends of the springs contact the curved plates 4 which are constructed to relieve the rear ends of the springs from strain while said ends still perform the function of pulling the load. The rebound actions resulting from the heavy load are thus checked, causing the load to ride easy, in fact making a very easy riding spring under light loads and affording greater resistance as the load is increased. Furthermore, under all conditions of load the traction stresses are never unduly increased on the spring or its rear connections owing to the flexing of the spring against said curved plate 4, whereby the outer ends of said spring, when under full compression, approximate the curvature against said plate 4 that said spring would have normally when under light load stresses. The plates 4, hoods 6 and flanges 7 serve to enclose the rear ends of the springs 16.

Attention is called to the chassis sills which are provided with the spaced openings 21 whereby the bracket plates 18 and the housings 3 may be removed and secured to said chassis sills in different positions whereby the rear wheels 2 may be positioned nearer or further away from the rear end of the chassis frame 1.

We are aware that numerous details of construction may be varied through a wide range without departing from the principles of this invention, and we therefore do not purpose limiting the patent granted otherwise than necessitated by the prior art.

We claim as our invention:

1. The combination with a motor truck chassis frame, of shackles supported thereon, springs having the front ends thereof supported on said shackles, housings secured to the sides of the rear portion of said frame, studs supported in said housings, said springs having the rear ends thereof engaged on said studs, and plates formed on said housings above the rear portions of the springs adapted to be contacted by said springs to permit said springs to compensate for heavy loads when carried by the truck.

2. The combination with a vehicle chassis and springs, said chassis having a series of spaced openings therein, of means for supporting the opposite ends of said springs from said chassis, said means being connected to said chassis through said spaced openings therein whereby said means may be adjusted to different positions along said chassis and toward or from each other.

3. The combination with a vehicle chassis and springs, of housings and bracket plates, said vehicle chassis having a series of spaced openings therein to permit said housings and bracket plates to be bolted to said vehicle chassis in different positions, shackles pivoted to said bracket plates and connected with said springs, and studs supported in said housings to afford supports for the other ends of said springs.

4. The combination with a motor truck chassis frame having spaced openings therein, bracket plates removably and adjustably bolted to said frame through said openings, shackles pivoted to said bracket plates, springs connected to said shackles, housings also removably and adjustably bolted to said frame through said openings, studs in said housings to which said springs are also connected, and curved plates on said housings adapted to be contacted by said springs to permit said springs to compensate for varying loads.

In testimony whereof, we have hereunto subscribed our names in the presence of two subscribing witnesses.

ALBERT EUGENE COOK.
THOMAS VAN TUYL.

Witnesses:
CARLTON HILL,
C. B. COOK.